(12) United States Patent
Markwalder et al.

(10) Patent No.: US 11,161,303 B2
(45) Date of Patent: Nov. 2, 2021

(54) PLATFORM CARRIER AND AN ASSEMBLY FOR ADDITIVE MANUFACTURING

(71) Applicant: System 3R International AB, Vaellingby (SE)

(72) Inventors: Urs Markwalder, St. Gallen (CH); Romain Dubreuil, Biel (CH); Ralf Loettgen, Biel (CH)

(73) Assignee: SYSTEM 3R INTERNATIONAL AB, Vaellingby (SE)

( * ) Notice: Subject to any disclaimer, the term of this patent is extended or adjusted under 35 U.S.C. 154(b) by 0 days.

(21) Appl. No.: 16/445,241

(22) Filed: Jun. 19, 2019

(65) Prior Publication Data

US 2020/0023581 A1 Jan. 23, 2020

(30) Foreign Application Priority Data

Jul. 19, 2018 (EP) .................................. 18184337

(51) Int. Cl.
*B29C 64/245* (2017.01)
*B33Y 30/00* (2015.01)
*B29C 64/295* (2017.01)

(52) U.S. Cl.
CPC .......... *B29C 64/245* (2017.08); *B29C 64/295* (2017.08); *B33Y 30/00* (2014.12)

(58) Field of Classification Search
CPC ... B29C 64/245; B29C 64/106; B29C 64/118; B29C 64/209; B29C 64/295; B29C 64/40; B33Y 30/00; B33Y 50/02; B33Y 10/00
USPC .......................................................... 425/375
See application file for complete search history.

(56) References Cited

U.S. PATENT DOCUMENTS

| | | | |
|---|---|---|---|
| 2007/0023977 A1 | 2/2007 | Braun et al. | |
| 2013/0327917 A1* | 12/2013 | Steiner | B33Y 40/00 248/649 |
| 2015/0044319 A1* | 2/2015 | Sakurai | B29C 64/255 425/174.4 |
| 2015/0174824 A1* | 6/2015 | Gifford | B29C 64/182 425/183 |
| 2017/0043538 A1* | 2/2017 | Chang | B29C 64/245 |
| 2017/0313049 A1* | 11/2017 | Colchester | B33Y 30/00 |
| 2018/0065301 A1 | 3/2018 | Mayer et al. | |
| 2019/0009469 A1* | 1/2019 | Feeney | B29C 41/46 |

(Continued)

FOREIGN PATENT DOCUMENTS

| | | | | |
|---|---|---|---|---|
| CN | 207459230 U * | 6/2018 | ......... | H01L 23/4006 |
| DE | 10342880 A1 * | 4/2005 | ............ | B22F 3/1055 |

(Continued)

OTHER PUBLICATIONS

Merriam-Webster."Embedded". Nov. 28, 2017. https://www.merriam-webster.com/dictionary/embedded (Year: 2017).*

*Primary Examiner* — Nahida Sultana
*Assistant Examiner* — Margaret B Hayes
(74) *Attorney, Agent, or Firm* — Leydig, Voit & Mayer, Ltd.

(57) ABSTRACT

A platform carrier that is mountable on a machine table of an additive manufacturing machine. The platform carrier is exchangeable and has a rigid construction. In an embodiment, at least one heating element is integrated in the platform carrier. In an embodiment, a plurality of fixing modules for connecting a build plate onto the platform carrier is integrated in the platform carrier.

20 Claims, 6 Drawing Sheets

(56) References Cited

U.S. PATENT DOCUMENTS

2019/0030806 A1\* 1/2019 Herman ................ B29C 64/209
2019/0115282 A1\* 4/2019 Wu ..................... H01L 23/4006

FOREIGN PATENT DOCUMENTS

| DE | 10342880 A1 | 4/2005 | |
| EP | 3292988 A1 \* | 3/2018 | ............. B33Y 30/00 |
| EP | 3292988 A1 | 3/2018 | |
| WO | 9629192 A1 | 9/1996 | |
| WO | WO 2017051029 A1 | 3/2017 | |

\* cited by examiner

PLATFORM CARRIER AND AN ASSEMBLY FOR ADDITIVE MANUFACTURING

CROSS-REFERENCE TO PRIOR APPLICATION

Priority is claimed to European Patent Application No. EP 18 184 337.6, filed on Jul. 19, 2018, the entire disclosure of which is hereby incorporated by reference herein.

FIELD

The present invention is related to the field of additive manufacturing. In particular, the present invention is related to a platform carrier applied in an additive manufacturing machine. In addition, the present invention is related to an assembly used in an additive manufacturing machine. Furthermore, the present invention is related to an additive manufacturing machine including the assembly.

BACKGROUND

Additive manufacturing process is known to produce three-dimensional objects. The objects are built up layer by layer. The main processes are depositing materials on a build plate mounted on the machine table and hardening the deposited materials. One of the hardening methods is laser sintering.

WO 96/29192 describes a device for producing a three dimensional object by the successive solidification of layers of a material hardenable by electromagnetic or particle radiation at the points corresponding to the cross-section of the object. The device has a support adjustable for height, a device for applying a layer of hardenable material to the support on a previously formed layer and an irradiation device and a control for the irradiation device for irradiating points of the layer corresponding to the object. A heating device is arranged in the machine table to solidify a region of the material surrounding the object by the effect of heat.

The additive manufacturing process induces stress inside the workpieces due to its thermal nature, e.g. temperature gradient. The standard solution to solve this problem on the market is to have a fixed heating element in the machine that heats the build plate on which the workpiece is built by thermal conduction. For example, heating elements are integrated into the machine table in order to reduce the temperature gradient, thereby stress.

EP 3 292 988 A1 describes a support for a changeable platform for a generative layer building apparatus, which is designed to produce at least one three-dimensional object by layering a powdery building material at the locations corresponding to the at least one object in the respective layers on a removable platform. The changeable platform support comprises a clamping device for securing one position of the removable platform with respect to the position of the support for a changeable platform, a heating system adapted to supply at least a portion of its surroundings thermal energy and I or dissipate heat energy from at least part of its environment and a pressure device which is suitable to press at least part of the heating system against a removable platform when it is clamped in the clamping device.

In this application, the heating system is forced by an undefined mechanism (potentially springload) to maintain contact to the changeable platform. However, this undefined mechanism forces are counteracting to clamping force of a chuck used in the machine table. The heating element is integrated in the support for the changeable platform, which is integral part of the machine tool therefore, not exchangeable.

SUMMARY

In an embodiment, the present invention provides a platform carrier configured to be mounted on a machine table of an additive manufacturing machine, wherein the platform carrier is exchangeable and has a rigid construction.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

It is an objective of the present invention to provide an exchangeable platform carrier which can be mounted on a machine table of the additive manufacturing machine and which is more resistant to deformation caused by thermal conditions. In particular, it is an objective to provide an exchangeable assembly which can be mounted not only on a machine table of the additive manufacturing machine but also on a machine table of machines for pre- or post-processing.

In the present invention, an exchangeable platform carrier to be mounted on a machine table of an additive manufacturing machine has a rigid design. The platform carrier must be rigid to ensure the mechanical stability. Furthermore, the platform carrier is a standalone element being mountable on the machine table, and is not an integrated part of the machine table. During additive manufacturing production, the platform carrier is mounted on the machine table of an additive manufacturing machine using clamping systems, and a build plate is pre-tensioned mounted on the platform carrier such that an object can be produced directly on the build plate. After the additive manufacturing, the platform carrier and the build plate having the produced object thereon can be dismounted from the machine table of the additive manufacturing machine. If the produced object has to be further processed by post-processing e.g. milling process, EDM process and grinding process, the platform carrier and the build plate can be mounted into a machine for the post-processing. The rigid construction of the platform carrier is therefore essential. By using this platform carrier the production efficiency can also be increased, since the platform carrier can be simply dismounted from the additive manufacturing machine and mounted in other machines for further processing the objects.

In order to provide a homogenous thermal distribution over the entire surface of the platform carrier, at least one heating element is integrated in the platform carrier. This means, the heating element is a part of the exchangeable rigid platform carrier. A build plate on which an object is produced can be directly mounted on the platform carrier. The homogenous heating of the entire platform carrier results in a homogenous heating of the build plate. The heating element is not integrated into the machine, thus a simplified machine design can be achieved. A further advantage is that the platform carrier with or without the build plate can be heated in advance before the manufacturing at the outside of the machine, since the heating element is fixed integrated in the platform carrier.

In some embodiments, a plurality of fixing modules for connecting a build plate onto the platform carrier is integrated in the platform carrier. Thanks to the multiple fixing modules the platform carrier is prepared for different kind of build plates or preforms. This increases the versatility of the platform carrier and reduces the production costs. In an advantageous variant, the platform carrier comprises an upper part and a lower part and these two parts are firmly fixed together. For the production of the platform carrier, the upper part and the lower part are provided such that the heating element and the fixing modules can be embedded in the platform carrier. Then these two parts are firmly connected together such that the platform carrier retains always as one-piece, namely a standalone element. The upper part and the lower part can be firmly connected by screws or by welding to form a one-piece part and to provide sufficient rigidity.

In one variant, the heating element is embedded at least partly in the upper part of the platform carrier and the fixing modules are embedded at least partly in the lower part of the platform. The heating element is included in the platform carrier allowing for the heating source to be positioned at a small distance from the top of the platform carrier, very close to the build plate, when it is mounted. The efficiency of the heating is therefore improved. A chuck used to clamp the platform carrier to the machine and arranged below the platform carrier is thermally isolated from the heating.

In some embodiments, the heating element is an electric heating element such as induction type or resistors. Other concepts could be based on hot/cold liquids, this means, the heating/cooling is provided by a liquid media circuit.

In an advantageous variant, the fixing module is designed such that a build plate can be pre-tensioned connected to the platform carrier by the fixing module. The pre-tensioned connection can secure the connection between the platform carrier and the build plate and provides a tolerance freedom in view of deformation. In the z-direction a controlled degree of freedom for deformation between the platform carrier and the build plate is provided. For additive manufacturing, the build plate is pre-tensioned connected to the platform carrier by the fixing modules, such that an object can be built on the build plate.

In one preferred variant, the fixing module comprises a fixing screw for connecting the build plate and an elastic element arranged around the fixing screw for pre-tensioning the build plate, in particular the elastic element is a disc spring pack. Other variants can also be used as the elastic element, for example, an element made of elastic materials such like rubber, wave spring or spiral spring. In one variant, the fixing module comprises an anti-fatigue bolt or stress bolt for allowing a pre-tensioned connection of the build plate and platform carrier.

It is advantageous to integrate a thermal isolation layer in the platform carrier, preferably below the heating element. In this manner, the thermal influence from the heating element to the chuck can be further reduced.

In a variant, at least one holding element is embedded in the platform carrier and below the heating element to hold the heat element in the desired position, in particular, the holding element is elastic, such as a spring.

In some embodiments, at least one connecting device is provided on the bottom surface of the platform carrier for clamping the platform carrier on the machine table of the additive manufacturing machine. Since the additive manufacturing process does not induce a large force on the platform carrier, the main requirement is to position the platform carrier in the desired position, the platform carrier can be clamped on the machine table by using one chuck. Using one single chuck provides the degree of freedom for expansion of the platform carrier in X-Y plane. In addition, an automatic chuck can be used as a prerequisite for automated handling of the platform carrier and the build plate. The connecting device is for example a drawbar screw thread for receiving a drawbar of the chuck.

In a preferred variant, one connecting device is arranged in the center of the bottom surface of the platform carrier and two or more connecting devices for post-processing machining are arranged symmetrically in respect to the connecting device arranged in the center. As explained above, prior or after the additive manufacturing a pre- or post-processing machining may be required for example to adjust the structure of the object. In order to improve the automation of the machining processing, two or more connecting devices are provided on the bottom surface of the platform carrier to allow automatic clamping the platform carrier with or without the build plate into the machines for pre- or post-processing. In one variant, the connecting devices are drawbar screw threads for receiving drawbars of a clamping system.

In the present invention, an exchangeable assembly to be mounted on a machine table of an additive manufacturing machine comprises a platform carrier and a build plate. The assembly is designed such that the build plate can be pre-tensioned mounted on the platform carrier. In some advantageous embodiments, the assembly can but must not be pre-heated inside or outside of the machine. In one variant the assembly is pre-heated inside the machine. In another variant, the assembly is pre-heated outside of the machine. In a third variant, the assembly is not pre-heated, neither inside, nor outside of the machine.

In a preferred variant, the thickness of the platform carrier is typically but must not be larger than the thickness of the build plate. The platform carrier has a rigid design and provides sufficient mechanical stability. For this reason, the build plate, which must be changed more frequently than the platform carrier can be a thin plate, thus reducing its production costs. This is of particular importance when manufacturing parts in high value materials, since the build plate is typically consisting of the same material like the part. The material used for the platform carrier is of minor relevance for the manufacturing process, thus can be standard, cost efficient material, for instance corrosion resistant tool steel.

In one variant, the fixing modules are arranged in the form of an array to ensure the pre-tensioned contact between the platform carrier and the build plate over the entire area.

In the present invention, an additive manufacturing machine comprises a machining table and an exchangeable assembly fixed on the machine table.

Figure 1:
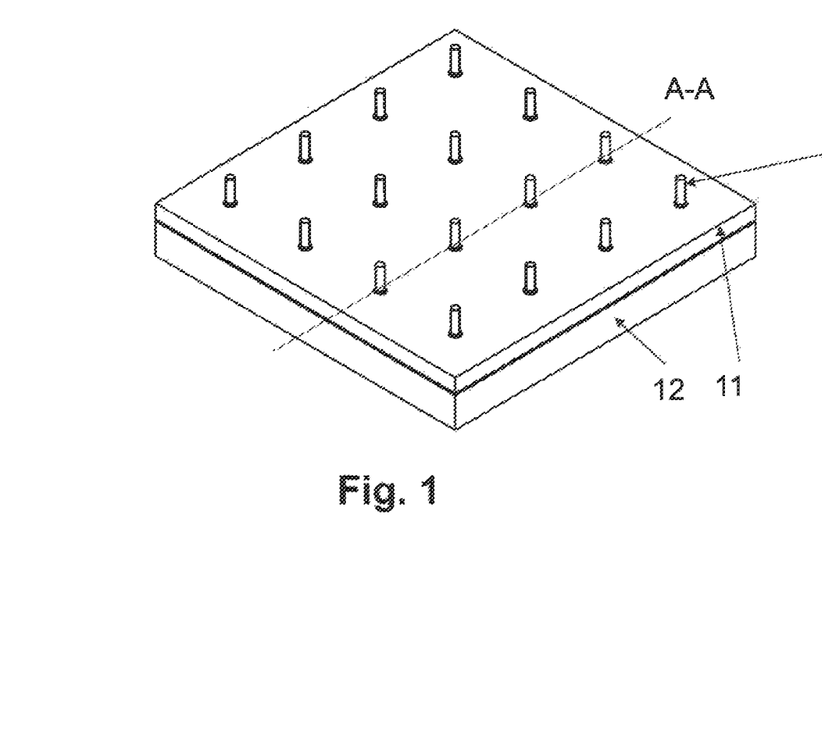
FIG. 1 illustrates a perspective view of one embodiment of a platform carrier.

FIG. 1 shows a 3-dimensional view of one embodiment of a platform carrier, which comprises an upper part 11 and a lower part 12. At least one heating element is integrated between the upper and the lower part and a plurality of fixing screw boxes is embedded in the lower part. The fixing screw box includes a fixing screw 13, which can be mounted from the bottom surface of platform carrier through thereof and protrudes from the top surface of the platform carrier, such that additional elements, e.g. a build plate can be fixed on the top of the platform carrier.

Figure 2:
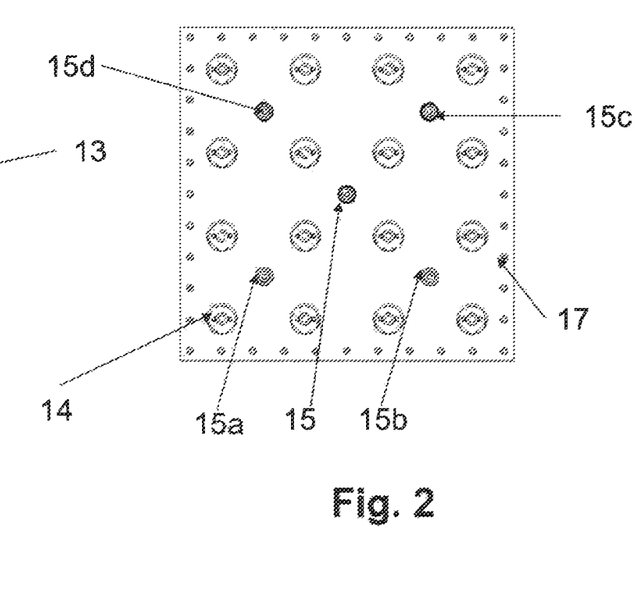
FIG. 2 illustrates a bottom view of one embodiment of the platform carrier.

FIG. 2 shows a bottom view of the platform carrier. In this embodiment, sixteen fixing screw boxes 14, each consisting of a disc spring pack 21 as an elastic element, a sleeve 24 and a locking element 23 are provided in the platform carrier for receiving sixteen fixing screws 13. However, the number of the fixing screw boxes and fixing screws is not limited to sixteen. In the middle of the bottom surface a first drawbar screw thread 15 is provided for receiving a drawbar of a clamping system. During the additive manufacturing process the platform carrier must be fixed on a machine table through a clamping device which enables a simple mounting and dismounting of the platform carrier. Around the first drawbar thread, a second 16a, a third 16b, a fourth 16c and a fifth 16d drawbar screw thread are provided on the bottom surface of the platform carrier. These additional drawbar threads are designed to receive drawbars of clamping systems provide in the machine tools for pre- and post-processing, for example, a milling machine, EDM machine or a grinding machine. In addition, one of them can be used as a reference for the rotation direction when the platform carrier is mounted in the additive manufacturing machine. For additive manufacturing, it is preferred to mount the platform carrier on the machine table through one drawbar. In additive manufacturing the positioning of platform carrier is essential but the additive processing does not generated a large force on the platform carrier, therefore, holding the platform carrier by one drawbar provides sufficient stability. The further advantage is the platform can still expand in X-Y direction to avoid deformation of the platform carrier caused by thermal effect in the platform carrier and to avoid over determination caused by multiple drawbars/chucks due to potential process induced deformations.

Figure 3:
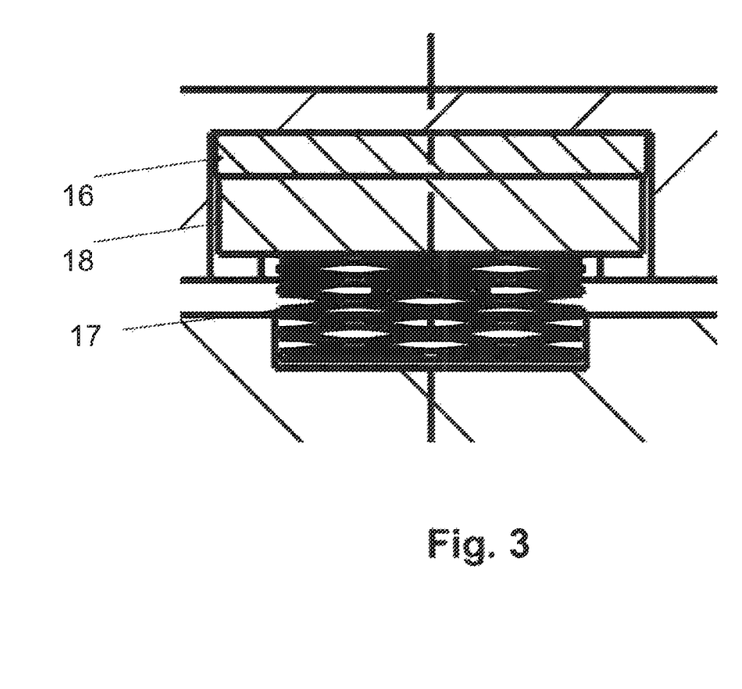
FIG. 3 illustrates a schematic view of an integrated heating element.

FIG. 3 shows a schematic view of the arrangement of a heating element 16 integrated in the platform carrier. A chamber is formed in the platform carrier. FIG. 3 shows one variant that the chamber is formed in the upper part and the lower part for receiving the heating element 16 and a spring 17 to hold the heating element in the desired position. Optionally an isolation layer 18 can be provided under the heating element to prevent the transfer of heating to the clamping device. In particular, the heating element and an isolation layer are held by the spring 17, which pushes the heating element onto the top inner surface of the chamber by elastic force. The upper part and the lower part of the platform carrier are fixed together by screws. In one variant, electric connection to the heating elements is provided by wiring within the gap between the upper and the lower part of the carrier. This wiring of the individual heating elements is connected to one central connector at the bottom side of the lower part and from there further to a connector provided by the machine table. Since the heat generated by the heating element may transfer downwards to the clamping device, on which the platform carrier can be mounted, an isolation layer is required to avoid the deformation of the clamping device due to the heat.

Figure 4:
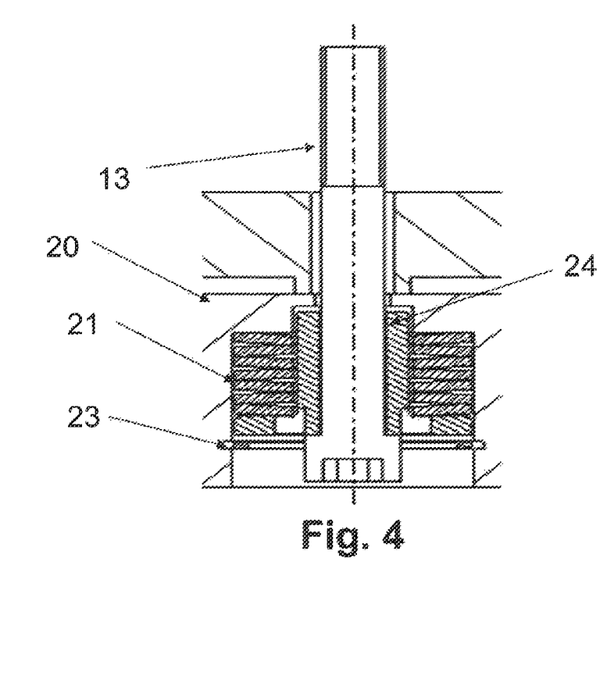
FIG. 4 illustrates a schematic view of a fixing screw box.

FIG. 4 shows a schematic view of a fixing screw box positioned in a recess in the lower part of the platform carrier. The fixing screw box includes a sleeve 24, a spring disc pack 21 and a locking element 23. Through each fixing screw box, a fixing screw thread is provided in the platform carrier as shown in FIG. 1. The fixing screw 13 shown in FIG. 1 is loosely mounted into the fixing screw box. A sleeve 24 is firmly positioned concentrically around the fixing screw such that a spring disc pack 21 can be positioned around the sleeve and are supported by the outer surface of the sleeve in the radial direction and below the spring disc pack 21 for distribution of the load. In order to hold the sleeve and the spring disc pack and prevent the falling out thereof, the locking element 23 is arranged below the sleeve 24. If an additional plate for example a build plate is mounted on the platform carrier, the additional plate and the platform carrier are pressed together by the spring disc pack through the fixing screw to ensure the connection of the additional plate and the platform carrier.

Figure 5:
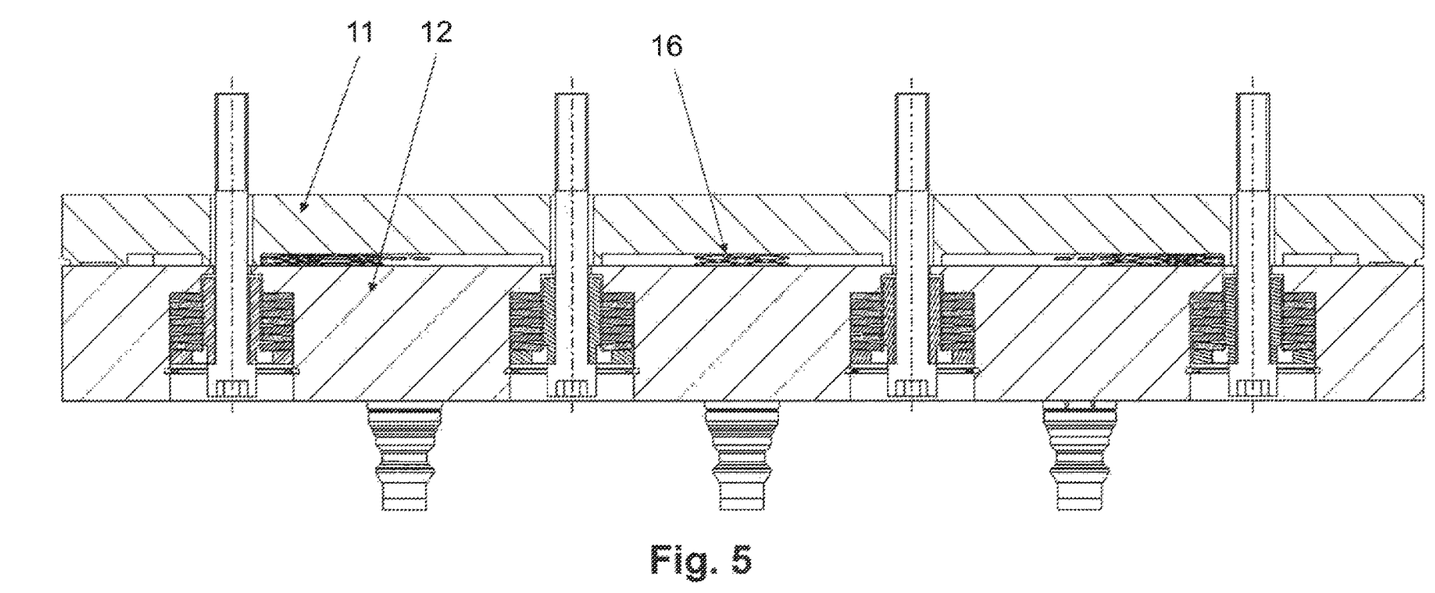
FIG. 5 illustrates a sectional view of the platform carrier taken along line A-A of FIG. 1.

FIG. 5 shows a section view of the platform carrier along the A-A of FIG. 1.

Figure 6:
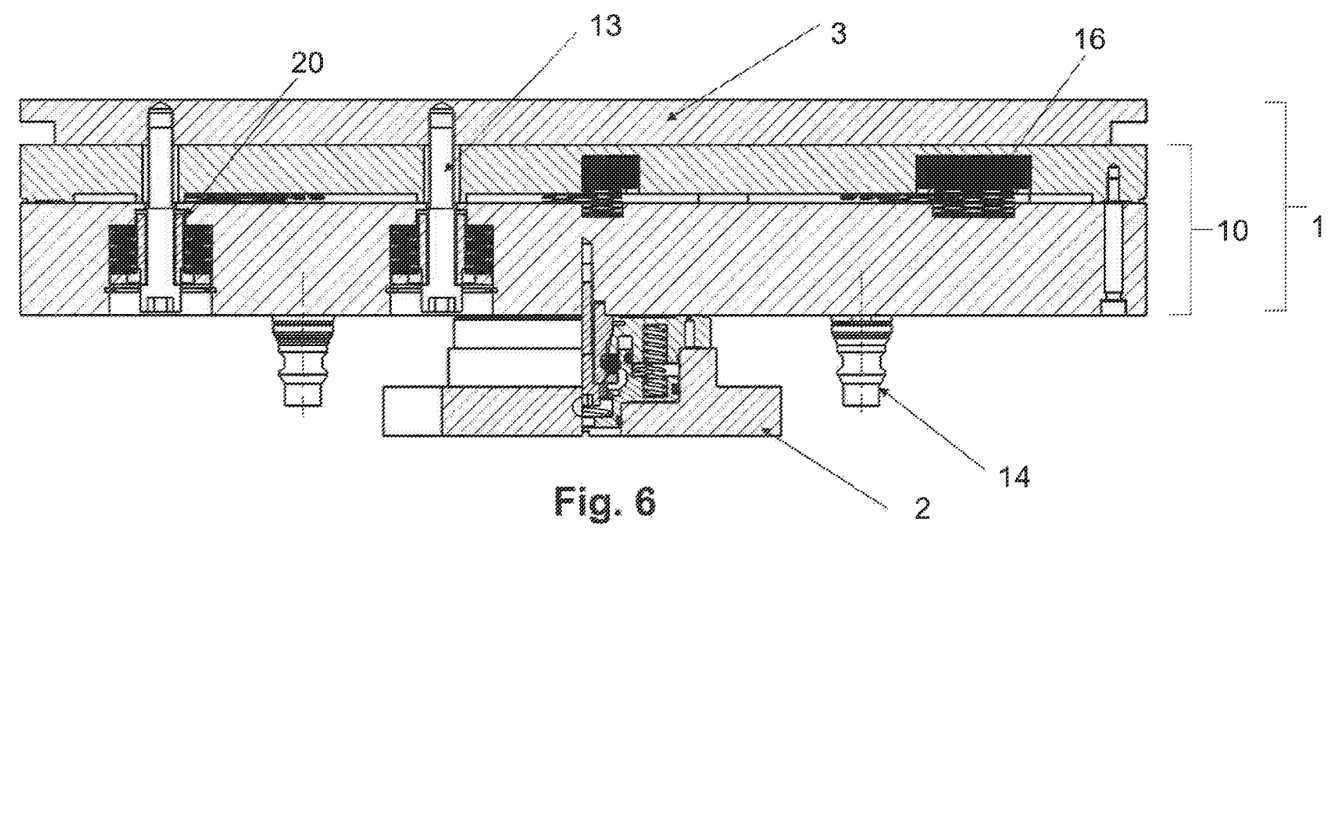
FIG. 6 illustrates the complete setup with the chuck integrated into the machining table of the additive manufacturing machine and including the platform carrier with integrated heating element.

FIG. 6 shows the assembly 1 including the platform carrier having the integrated heating element and the build plate in a mounted state. The build plate and the platform carrier are connected by the fixing screws 13 and for each fixing screw a fixing screw box 20 is provided to ensure the pre-tensioning function. The assembly is clamped through a drawbar 14 to a chuck 2 integrated into the machine table.

Figure 7:
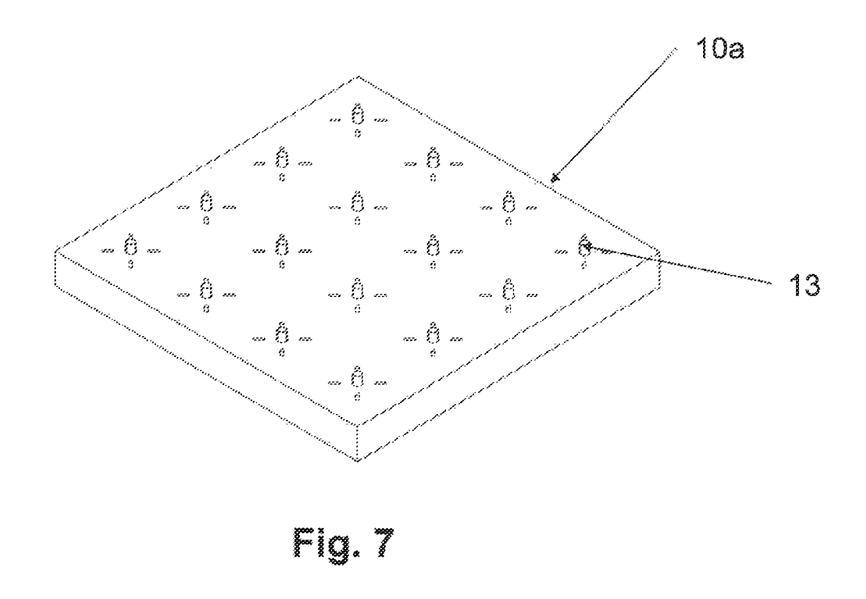
FIG. 7 illustrates an embodiment of a platform carrier without heating.

FIG. 7 shows another embodiment of the platform carrier 10a without heating, which is formed in a single plate construction. But the platform carrier comprises a plurality of elastic elements for pre-tensioned connecting a build plate onto the platform carrier by a plurality of fixing screws 13.

Figure 8:
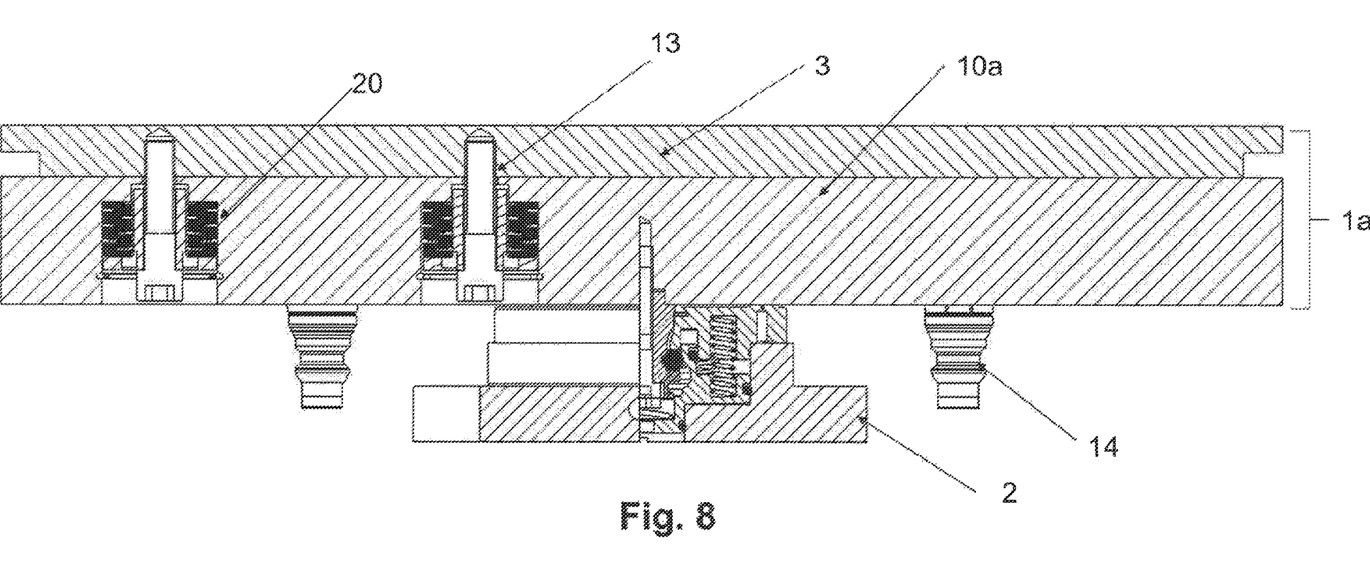
FIG. 8 illustrates the complete setup with the chuck integrated into the machining table of the additive manufacturing machine and including the platform carrier without heating.

FIG. 8 shows an assembly 1a including the platform carrier without heating element and the build plate in a mounted state. The build plate 3 and the platform carrier 10a are connected by the fixing screws 13 and for each fixing screw a fixing screw box 20 is provided to ensure the pre-tensioning function. The assembly 1a is clamped through a drawbar 14 to a chuck 2 integrated into the machine table.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCES 1 assembly having platform carrier with integrated heating element
1a assembly having platform carrier without integrated heating element
2 chuck
3 build plate
10, platform carrier with integrated heating element
10a platform carrier without integrated heating element
11 upper part
12 lower part
13 fixing screw
14 drawbar
15, 15a, 15b, 15c, 15d first, second, third, fourth, fifth drawbar screw thread
16 heating element
17 spring
18 isolation layer
20 fixing screw box
21 spring disc pack
23 locking element
24 sleeve

What is claimed is:

1. A platform carrier configured to be exchangeably mountable between a machine table of an additive manufacturing machine and a machine table of another processing machine, the platform carrier comprising:
a one-piece plate; and
a plurality of fixing modules configured to connect a build plate onto the platform carrier, the build plate being configured such that an object is directly producible by the additive manufacturing machine on the build plate, each of the plurality of fixing modules being at least partially arranged within the one-piece plate and each comprising:
a fixing screw configured to connect to the build plate; and
an elastic element arranged around at least a portion of the fixing screw, arranged entirely within the platform carrier, arranged at least partially within the one-piece plate, and configured for pre-tensionably connecting the build plate on a top of the platform carrier,
wherein the platform carrier has a rigid construction, and
wherein the plurality of fixing modules are arranged in an array.

2. The platform carrier according to claim 1, wherein each of the plurality of fixing modules comprise:
a fixing screw box arranged in the one-piece plate,
wherein the elastic element arranged entirely in the fixing screw box.

3. The platform carrier according to claim 2, wherein the elastic element comprises a disc spring pack.

4. The platform carrier according to claim 2,
wherein the fixing screw box is positioned in a recess in the one-piece plate of the platform carrier,
wherein the fixing screw box further comprises a sleeve and a lock;
wherein the fixing screw is loosely mounted into the fixing screw box at a lower side of the fixing screw box configured to face toward a bottom of the build plate,
wherein the sleeve is firmly positioned in the platform carrier around the fixing screw,
wherein the elastic element is positioned around the sleeve and supported by the sleeve, and
wherein the lock is configured to hold the sleeve and the elastic element.

5. The platform carrier according to claim 1, further comprising at least one connecting device on a bottom surface of the platform carrier configured to clamp the platform carrier on the machine table of the additive manufacturing machine.

6. The platform carrier according to claim 1, further comprising one connecting device arranged in a center of a bottom surface of the platform carrier and two or more connecting devices configured for successive machining arranged symmetrically with respect to the one connecting device arranged in the center.

7. The platform carrier according to claim 1, the platform carrier comprising:
an upper part and a lower part, the lower part being the one-piece plate;
a heating element, the heating element being arranged between a top surface of the upper part and a bottom surface of the lower part in an interior portion of the platform carrier; and
a first connecting means configured to firmly connect the upper part to the lower part forming the platform carrier as a rigid stand-alone element; and
wherein the plurality of fixing modules are separate from the first connecting means.

8. The platform carrier according to claim 7,
wherein the heating element is arranged at least partly within the upper part.

9. The platform carrier according to claim 7, wherein the the heating element comprises an electric heating element, or
wherein heating or cooling is provided by a liquid media circuit.

10. The platform carrier according to claim 7, wherein a thermal isolation layer is arranged below the heating element in the platform carrier.

11. The platform carrier according to claim 10, wherein the thermal isolation layer is arranged within the platform carrier below the heating element.

12. The platform carrier according to claim 7, further comprising at least one holding element arranged within the platform carrier and below the heating element to hold the heating element in position.

13. The platform carrier according to claim 12, wherein the at least one holding element is elastic.

14. The platform carrier according to claim 7, wherein the first connecting means comprises a screw or a weld.

15. An exchangeable assembly to be mounted on a machine table of an additive manufacturing machine, the exchangeable assembly comprising:
a build plate, the build plate being configured such that an object is directly producible by the additive manufacturing machine on the build plate; and
a platform carrier configured to be exchangeably mounted on the machine table of the additive manufacturing machine, the platform carrier comprising:
a one-piece plate; and a plurality of fixing modules configured to connect a build plate onto the platform carrier, each of the plurality of fixing modules being at least partially arranged within the one-piece plate and each of the plurality of fixing modules comprising:
a fixing screw configured to connect to the build plate; and
an elastic element arranged around at least a portion of the fixing screw, arranged entirely within the platform carrier, arranged at least partially within the one-piece plate, and configured for pre-tensionably connecting the build plate on a top of the platform carrier,
wherein the platform carrier has a rigid construction,
wherein the plurality of fixing modules are arranged in an array.

16. The exchangeable assembly according to claim 15, wherein the exchangeable assembly is configured so as to be pre-heated either inside or outside of the additive manufacturing machine.

17. The exchangeable assembly according to claim 15, wherein the plurality of fixing modules are arranged in the form of the array so as to ensure pre-tensioned contact between the platform carrier and the build plate over an entire area.

18. An additive manufacturing machine, comprising:
a machining table; and
the exchangeable assembly according to claim 15,
wherein the exchangeable assembly is fixed on the machine table by an automatic clamping device.

19. The exchangeable assembly according to claim 15, wherein the platform carrier comprises:
an upper part and a lower part, the lower part being the one-piece plate;
a heating element, the heating element being arranged between a top surface of the upper part and a bottom surface of the lower part in an interior portion of the platform carrier; and
a first connecting means configured to firmly connect together the upper part and the lower part forming the platform carrier as a rigid stand-alone element,
wherein the each of the plurality of fixing modules are separate from the first connecting means.

20. A platform carrier configured to be exchangeably mountable between a machine table of an additive manufacturing machine and a machine table of another processing machine, the platform carrier comprising:
a one-piece plate; and
a plurality of fixing modules configured to connect a build plate onto the platform carrier, each of the plurality of fixing modules being at least partially arranged within the one-piece plate and each comprising:
a fixing screw configured to connect to the build plate;
an elastic element arranged around at least a portion of the fixing screw, arranged at least partially within the one-piece plate, and configured for pre-tensionably connecting the build plate on a top of the platform carrier; and
at least one connecting device on a bottom surface of the platform carrier configured to clamp the platform carrier on the machine table of the additive manufacturing machine,
wherein the platform carrier has a rigid construction,
wherein the connecting device comprises at least one drawbar screw thread, the at least one drawbar screw thread being configured to automatically receive a drawbar of clamping systems provided in the another processing machine for pre- or post-processing.

* * * * *